(12) United States Patent
Williams (10) Patent No.: US 7,093,151 B1
(45) Date of Patent: Aug. 15, 2006

(54) CIRCUIT AND METHOD FOR PROVIDING A PRECISE CLOCK FOR DATA COMMUNICATIONS

(75) Inventor: Timothy J. Williams, Bellevue, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 933 days.

(21) Appl. No.: 09/668,801

(22) Filed: Sep. 22, 2000

(51) Int. Cl.
*G06F 1/04* (2006.01)
(52) U.S. Cl. .................. 713/500; 713/501; 713/600
(58) Field of Classification Search .............. 713/500, 713/501, 600; 331/1 A, 44; 375/344
See application file for complete search history.

(56) References Cited

U.S. PATENT DOCUMENTS

| | | | |
|---|---|---|---|
| 4,061,987 A | 12/1977 | Nagahama | 331/111 |
| 4,272,760 A | 6/1981 | Prazak et al. | 340/347 |
| 4,344,067 A | 8/1982 | Lee | 340/347 |
| 4,534,030 A * | 8/1985 | Paez et al. | 714/732 |
| 4,689,740 A | 8/1987 | Moelands et al. | 364/200 |
| 4,692,718 A | 9/1987 | Roza et al. | 331/113 R |
| 4,868,525 A | 9/1989 | Dias | 331/111 |
| 4,947,169 A | 8/1990 | Smith et al. | 341/121 |
| 4,993,048 A * | 2/1991 | Williams et al. | 375/344 |
| 5,140,197 A | 8/1992 | Grider | 307/480 |
| 5,150,079 A | 9/1992 | Williams et al. | 331/75 |
| 5,175,884 A | 12/1992 | Suarez | 455/260 |
| 5,200,751 A | 4/1993 | Smith | 341/147 |
| 5,206,857 A * | 4/1993 | Farleigh | 370/452 |
| 5,304,955 A | 4/1994 | Atriss et al. | 331/1 R |
| 5,319,370 A | 6/1994 | Signore et al. | 341/120 |
| 5,337,335 A * | 8/1994 | Cloetens et al. | 375/376 |
| 5,345,195 A | 9/1994 | Cordoba et al. | 331/111 |
| 5,418,603 A * | 5/1995 | Kusumoto et al. | 399/16 |
| 5,428,319 A | 6/1995 | Marvin et al. | 331/176 |
| 5,440,305 A | 8/1995 | Signore et al. | 341/120 |
| 5,546,433 A | 8/1996 | Tran et al. | 375/376 |
| 5,552,748 A | 9/1996 | O'Shaughnessy | 331/1 A |
| 5,559,502 A | 9/1996 | Schutte | 340/825.21 |
| 5,563,553 A | 10/1996 | Jackson | 331/57 |
| 5,565,819 A | 10/1996 | Cooper | 331/111 |
| 5,583,501 A | 12/1996 | Henrion et al. | 341/118 |
| 5,594,612 A | 1/1997 | Henrion | 341/120 |
| 5,604,466 A | 2/1997 | Dreps et al. | 331/113 R |
| 5,666,118 A | 9/1997 | Gersbach | 341/120 |
| 5,668,506 A | 9/1997 | Watanabe et al. | 331/66 |
| 5,670,915 A | 9/1997 | Cooper et al. | 331/111 |
| 5,682,049 A | 10/1997 | Nguyen | 257/363 |
| 5,686,863 A | 11/1997 | Whiteside | 330/260 |
| 5,689,196 A | 11/1997 | Schutte | 326/86 |
| 5,699,024 A | 12/1997 | Manlove et al. | 331/111 |
| 5,726,597 A | 3/1998 | Petty et al. | 327/307 |

(Continued)

FOREIGN PATENT DOCUMENTS

WO    WO 96/17305    6/1996

(Continued)

OTHER PUBLICATIONS

A 30-MHz Hybrid Analog/Digital Clock Recovery Circuit in 2-μm CMOS, By: Beomsup Kim et al., Journal of Solid-State Circuits, vol. 25, No. 6, Dec. 1990, pp. 1385-1394.

(Continued)

*Primary Examiner*—Chun Cao
(74) *Attorney, Agent, or Firm*—Christopher P. Maiorana, PC (57) ABSTRACT

An apparatus comprising a circuit configured to (i) generate an output having a frequency and (ii) adjust the frequency in response to a measured duration of a known time interval associated with an input data stream.

25 Claims, 5 Drawing Sheets

U.S. PATENT DOCUMENTS

| | | | |
|---|---|---|---|
| 5,796,312 A | 8/1998 | Hull et al. | 331/44 |
| 5,799,177 A * | 8/1998 | McKenzie et al. | 713/501 |
| 5,818,370 A | 10/1998 | Sooch et al. | 341/120 |
| 5,825,317 A | 10/1998 | Anderson et al. | 341/120 |
| 5,870,004 A | 2/1999 | Lu | 331/176 |
| 5,870,345 A | 2/1999 | Stecker | 365/222 |
| 5,898,345 A | 4/1999 | Namura et al. | 331/177 V |
| 5,933,058 A * | 8/1999 | Pinto et al. | 331/17 |
| 6,065,126 A * | 5/2000 | Tran et al. | 713/401 |
| 6,157,266 A | 12/2000 | Tsai et al. | 331/57 |
| 6,158,014 A * | 12/2000 | Henson | 713/501 |
| 6,191,660 B1 * | 2/2001 | Mar et al. | 331/111 |
| 6,215,835 B1 * | 4/2001 | Kyles | 375/376 |
| 6,279,058 B1 * | 8/2001 | Gulick | 710/58 |
| 6,297,705 B1 * | 10/2001 | Williams et al. | 331/44 |
| 6,407,641 B1 * | 6/2002 | Williams et al. | 331/1 A |
| 6,407,682 B1 * | 6/2002 | Jones | 341/100 |
| 6,650,699 B1 * | 11/2003 | Tierno | 375/232 |

FOREIGN PATENT DOCUMENTS

| | | |
|---|---|---|
| WO | WO 98/34376 | 8/1998 |
| WO | WO 99/09712 | 2/1999 |

OTHER PUBLICATIONS

WP 3.5: An Integrated Time Reference, By: Robert A. Blauschild, ISSCC94/Session 3, Analog Techniques/Paper WP 3.5, 1994.

Micropower CMOS Temperature Sensor with Digital Output, By: Anton Bakker et al., 1996 IEEE.

CY7C63722/23 CY7C63742/43 enCoRe™ USB Combination Low-Speed USB & PS/2 Peripheral Controller, Cypress Semiconductor Corp., Feb. 2000—Revised Apr. 11, 2000, pp. 1-51.

An Analog PLL-Based Clock and Data Recovery Circuit with High Input Jitter Tolerance, By: Sam Yinshang Sun, Reprinted from IEEE Journal of Solid-State Circuits, vol. SC-24, pp. 325-330, Apr. 1989.

CY7C63221/31 enCoRe™ USB Low Speed USB Peripheral Controller, Cypress Semiconductor Corp., Feb. 2000—Revised Apr. 11, 2000, pp. 1-43.

Timothy J. Williams et al., "Auto-Locking Oscillator for Data Communications", U.S. Appl. No. 09/511,019, filed Feb. 23, 2000.

Timothy J. Williams et al., "Circuit for Locking an Oscillator to a Data Stream", U.S. Appl. No. 09/511,020, filed Feb. 23, 2000.

Universal Serial Bus Specification, Revision 2.0, Apr. 27, 2000, pp. 1-622.

Monte F. Mar et al., "Programmable Oscillator Scheme", U.S. Appl. No. 09/721,316, filed Nov. 22, 2000.

Monte F. Mar et al., "Programmable Oscillator Scheme", U.S. Appl. No. 09/275,336, filed Mar. 24, 1999.

* cited by examiner

Jitter Errors

| | Jitter Errors | |
|---|---|---|
| SOF Detect | 175 ns | Synchronization uncertainty |
| Osc. Jitter | 3 ns | |
| Frame Error | 90 ns | Host error beyond +/-0.05% accuracy |

INITIAL ERROR

Clk: 24 MHz

| Initial Clock Err | Frame Time (us) Nominal Time | Includes Osc Jitter Min Time | Max Time | Min Count | Max Count | ClkMinRange | | ClkMaxRange | |
|---|---|---|---|---|---|---|---|---|---|
| 0.00% | 1000000 | 999732 | 1000268 | 23993 | 24007 | 23.986 | 24.000 | 24.000 | 24.014 |
| 0.10% | 1000000 | 999732 | 1000268 | 23969 | 24031 | 23.962 | 23.976 | 24.024 | 24.038 |
| 0.20% | 1000000 | 999732 | 1000268 | 23945 | 24055 | 23.938 | 23.952 | 24.048 | 24.062 |
| 0.40% | 1000000 | 999732 | 1000268 | 23897 | 24103 | 23.890 | 23.904 | 24.096 | 24.110 |
| 0.60% | 1000000 | 999732 | 1000268 | 23849 | 24151 | 23.842 | 23.856 | 24.144 | 24.158 |
| 0.80% | 1000000 | 999732 | 1000268 | 23801 | 24199 | 23.794 | 23.808 | 24.192 | 24.206 |
| 1.00% | 1000000 | 999732 | 1000268 | 23753 | 24247 | 23.746 | 23.760 | 24.240 | 24.255 |
| 2.00% | 1000000 | 999732 | 1000268 | 23513 | 24487 | 23.506 | 23.520 | 24.479 | 24.495 |
| 3.00% | 1000000 | 999732 | 1000268 | 23273 | 24727 | 23.266 | 23.280 | 24.719 | 24.735 |
| 4.00% | 1000000 | 999732 | 1000268 | 23033 | 24967 | 23.026 | 23.040 | 24.959 | 24.975 |
| 5.00% | 1000000 | 999732 | 1000268 | 22793 | 25207 | 22.786 | 22.800 | 25.199 | 25.215 |
| 10.00% | 1000000 | 999732 | 1000268 | 21594 | 26408 | 21.587 | 21.601 | 26.400 | 26.416 |
| 20.00% | 1000000 | 999732 | 1000268 | 19194 | 28808 | 19.188 | 19.200 | 28.799 | 28.817 |
| 30.00% | 1000000 | 999732 | 1000268 | 16795 | 31209 | 16.790 | 16.801 | 31.200 | 31.218 |
| 40.00% | 1000000 | 999732 | 1000268 | 14396 | 33610 | 14.391 | 14.401 | 33.600 | 33.620 |
| 50.00% | 1000000 | 999732 | 1000268 | 11996 | 36010 | 11.992 | 12.000 | 35.999 | 36.021 |
| 60.00% | 1000000 | 999732 | 1000268 | 9597 | 38411 | 9.593 | 9.601 | 38.400 | 38.422 |
| 70.00% | 1000000 | 999732 | 1000268 | 7198 | 40811 | 7.195 | 7.201 | 40.799 | 40.823 |

OSC TRIM Values

| OSC TRIM Values | 24 MHz | @ Clock | Gain Error 12 % Trimmed Step Sizes |
|---|---|---|---|
| Min Step | | 0.000 MHz | 0.0132 MHz |
| Typ Step | 0.015 | 0.015 MHz | 0.0150 MHz |
| Max Step | | 0.000 MHz | 0.0168 MHz |
| Linearity Error: | | 0.75 LSB | |

POST-TUNE ERROR

| TuneAmount | | TuneCounts | Post - MIN Tuning | | | | TuneCounts | MAX Tuning | | | | Max Error... | |
|---|---|---|---|---|---|---|---|---|---|---|---|---|---|
| AveMin | AveMax | MIN | Typ-Min | % | Typ-Max | % | MAX | Typ-Min | % | Typ-Max | % | MIN | MAX |
| 0.007 | -0.007 | 0 | 23.976 | -0.1% | 24.013 | 0.1% | 0 | 23.987 | -0.1% | 24.024 | 0.1% | 0.10% | 0.10% |
| 0.031 | -0.031 | 2 | 23.978 | -0.1% | 24.023 | 0.1% | -2 | 23.977 | -0.1% | 24.022 | 0.1% | 0.09% | 0.09% |
| 0.055 | -0.055 | 4 | 23.980 | -0.1% | 24.032 | 0.1% | -4 | 23.968 | -0.1% | 24.020 | 0.1% | 0.13% | 0.13% |
| 0.103 | -0.103 | 7 | 23.972 | -0.1% | 24.035 | 0.1% | -7 | 23.965 | -0.1% | 24.028 | 0.1% | 0.14% | 0.14% |
| 0.151 | -0.151 | 10 | 23.964 | -0.2% | 24.037 | 0.2% | -10 | 23.963 | -0.2% | 24.036 | 0.2% | 0.15% | 0.15% |
| 0.199 | -0.199 | 13 | 23.955 | -0.2% | 24.039 | 0.2% | -13 | 23.961 | -0.2% | 24.045 | 0.2% | 0.19% | 0.19% |
| 0.247 | -0.247 | 16 | 23.947 | -0.2% | 24.042 | 0.2% | -16 | 23.958 | -0.2% | 24.053 | 0.2% | 0.22% | 0.22% |
| 0.487 | -0.487 | 32 | 23.918 | -0.3% | 24.071 | 0.3% | -32 | 23.929 | -0.3% | 24.082 | 0.3% | 0.34% | 0.34% |
| 0.727 | -0.727 | 48 | 23.889 | -0.5% | 24.099 | 0.4% | -48 | 23.900 | -0.4% | 24.111 | 0.5% | 0.46% | 0.46% |
| 0.967 | -0.967 | 64 | 23.861 | -0.6% | 24.128 | 0.5% | -64 | 23.872 | -0.5% | 24.140 | 0.6% | 0.58% | 0.58% |
| 1.207 | -1.207 | 80 | 23.832 | -0.7% | 24.157 | 0.7% | -80 | 23.843 | -0.7% | 24.169 | 0.7% | 0.70% | 0.70% |
| 2.406 | -2.408 | 160 | 23.689 | -1.3% | 24.301 | 1.3% | -161 | 23.683 | -1.3% | 24.301 | 1.3% | 1.29% | 1.32% |
| 4.806 | -4.808 | 320 | 23.402 | -2.5% | 24.589 | 2.5% | -321 | 23.394 | -2.5% | 24.589 | 2.5% | 2.49% | 2.53% |
| 7.205 | -7.209 | 480 | 23.116 | -3.7% | 24.877 | 3.7% | -481 | 23.106 | -3.7% | 24.879 | 3.7% | 3.68% | 3.72% |
| 9.604 | -9.610 | 640 | 22.829 | -4.9% | 25.165 | 4.9% | -641 | 22.819 | -4.9% | 25.169 | 4.9% | 4.88% | 4.92% |
| 12.004 | -12.010 | 800 | 22.542 | -6.1% | 25.453 | 6.1% | -801 | 22.530 | -6.1% | 25.457 | 6.1% | 6.08% | 6.13% |
| 14.403 | -14.411 | 960 | 22.256 | -7.3% | 25.741 | 7.3% | -961 | 22.242 | -7.3% | 25.747 | 7.3% | 7.27% | 7.32% |
| 16.802 | -16.811 | 1120 | 21.969 | -8.5% | 26.030 | 8.5% | -1121 | 21.954 | -8.5% | 26.036 | 8.5% | 8.46% | 8.53% |

FIG. 5

CIRCUIT AND METHOD FOR PROVIDING A PRECISE CLOCK FOR DATA COMMUNICATIONS

FIELD OF THE INVENTION

The present invention relates to a method and/or architecture for providing a precise clock generally and, more particularly, to a method and/or architecture for providing a precise clock without a precision timing element.

BACKGROUND OF THE INVENTION

Computer, microcontroller and microprocessor systems use one or more clock oscillator circuits to provide timing reference signals. Conventional clock oscillator circuits using an external-based clock can be used to provide a clock signal. A precision timing component (i.e., crystal, ceramic resonator, etc.) that is external to the oscillator circuit is required in an external-based clock oscillator. The precision timing component supplies a reference frequency for the clock oscillator. Interfacing to the timing component requires one or two pins of the chip that the external-based clock oscillator circuit is on. The precision timing component adds to the cost of a system. The chip uses the reference frequency presented by the timing component or further tunes the frequency to match the data rate of incoming data or a multiple of the data rate. Phase Lock Loop (PLL) and/or Delay Lock Loop (DLL) circuits can be used for locking to or matching data rates. Locking to or matching data rates sometimes requires long data 'training' sequences. Schemes that use a local fixed reference frequency do some phase shifting or phase selection to sample incoming data since the external and internal clock rates differ.

Conventional Universal Serial Bus (USB) communication systems are PLL based, with an accurate local clock. The USB device can be compliant with the USB specification version 2.0 (published April 2000), which is hereby incorporated by reference in its entirety. USB version 2.0 host Full-speed communications packets include accurately spaced 'Start Of Frame' (SOF) packets that arrive periodically every 1 ms±0.05% (i.e., 1.000 ms+500 ns)(see USB specification version 2.0, sections 7.1.11 and 7.1.12).

A clock oscillator that takes advantage of the accurately spaced USB SOF packets to calibrate the frequency of the clock signal would be desirable.

SUMMARY OF THE INVENTION

The present invention concerns an apparatus comprising a circuit configured to (i) generate an output having a frequency and (ii) adjust the frequency in response to a measured duration of a known time interval associated with an input data stream.

The objects, features and advantages of the present invention include providing a method and/or architecture for providing a precise clock that may (i) tune an oscillator to match a clock rate of a host system, (ii) require no external precision timing component, (iii) require no chip pins, (iv) precisely lock to an incoming data rate with 0.2% precision or better, and/or (v) perform 0.2% accurate timing of data communications without an external timing component.

BRIEF DESCRIPTION OF THE DRAWINGS

These and other objects, features and advantages of the present invention will be apparent from the following detailed description and the appended claims and drawings in which:

FIG. 5 is a table illustrating an accuracy analysis of various oscillators implemented in accordance with the present invention.

DETAILED DESCRIPTION OF THE PREFERRED EMBODIMENTS

Figure 1:
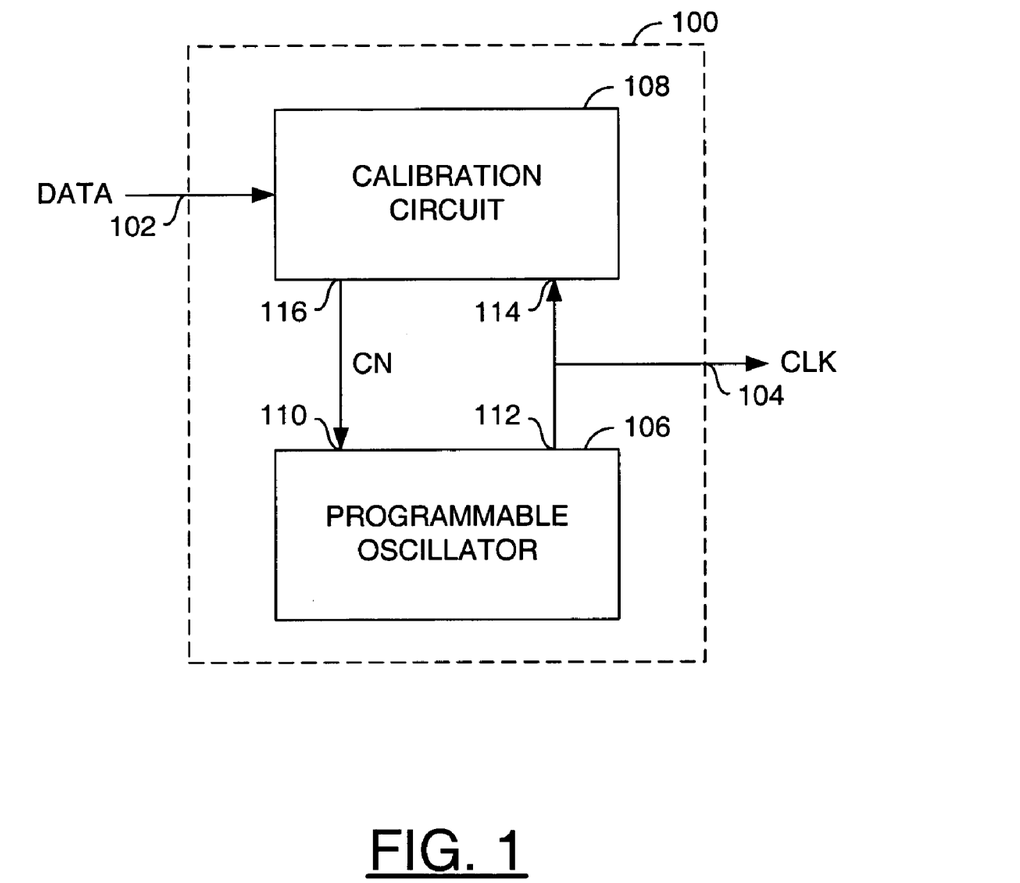
FIG. 1 is a block diagram illustrating a preferred embodiment of the present invention.

Referring to FIG. 1, a block diagram of a circuit 100 is shown in accordance with a preferred embodiment of the present invention. The circuit 100 may be a self-calibrating oscillator circuit. The circuit 100 may be used to generate a precise clock signal that may be, in one example, tuned to within 0.2% of a data rate of a data stream or a multiple of the data rate. The circuit 100 may be configured to maintain a precise clock frequency without a precision timing component (e.g., a crystal, ceramic resonator, etc.). The circuit 100 may be configured to adjust a frequency of oscillation of a local oscillator in response to the data rate of a data stream from a host system. The frequency of oscillation may be adjusted to within 0.2% of the host data rate. In one example, the data stream may be a USB data stream.

In general, the circuit 100 may generate a clock signal having an accuracy related to the host system data rate accuracy. The circuit 100 may have an input 102 that may receive the data stream (e.g., DATA) from the host system and an output 104 that may present a clock signal (e.g., CLK) that may be used, in one example, for data recovery. The signal DATA may be a serial data stream, for example, a full-speed communications data stream in accordance with the Universal Serial Bus (USB) version 2.0 standard (published April 2000), which is hereby incorporated by reference in its entirety. The signal DATA may have one or more periodic signal components of a known duration that may occur at precisely known time intervals. For example, USB version 2.0 start-of-frame (SOF) packets or any other appropriate periodic component that may be contained in a communication protocol.

The circuit 100 may comprise a circuit 106 and a circuit 108. The circuit 106 may be a programmable oscillator circuit. The circuit 108 may be a calibration circuit. The circuit 106 may have an input 110 that may receive a signal (e.g., CN) and an output 112 that may present the signal CLK. The circuit 106 may be configured to (i) generate the signal CLK having a default (untuned) frequency and (ii) adjust the frequency of the signal CLK in response to the signal CN. The signal CN may be, in one example, a digital tuning signal. However, other types of signals may be implemented accordingly to meet the design criteria of a particular application. The signal CN may be, in one example, 8-bits wide. However, other numbers of bit may be implemented to meet the design criteria of a particular application.

The circuit 108 may have the input 102 that may receive the signal DATA, an input 114 that may receive the signal CLK, and an output 116 that may present a signal CN. The circuit 108 may be configured to generate the signal CN in response to the signals DATA and CLK. For example, the signal CN may be generated in response to a measurement of the signal DATA made with the signal CLK.

Figure 2:
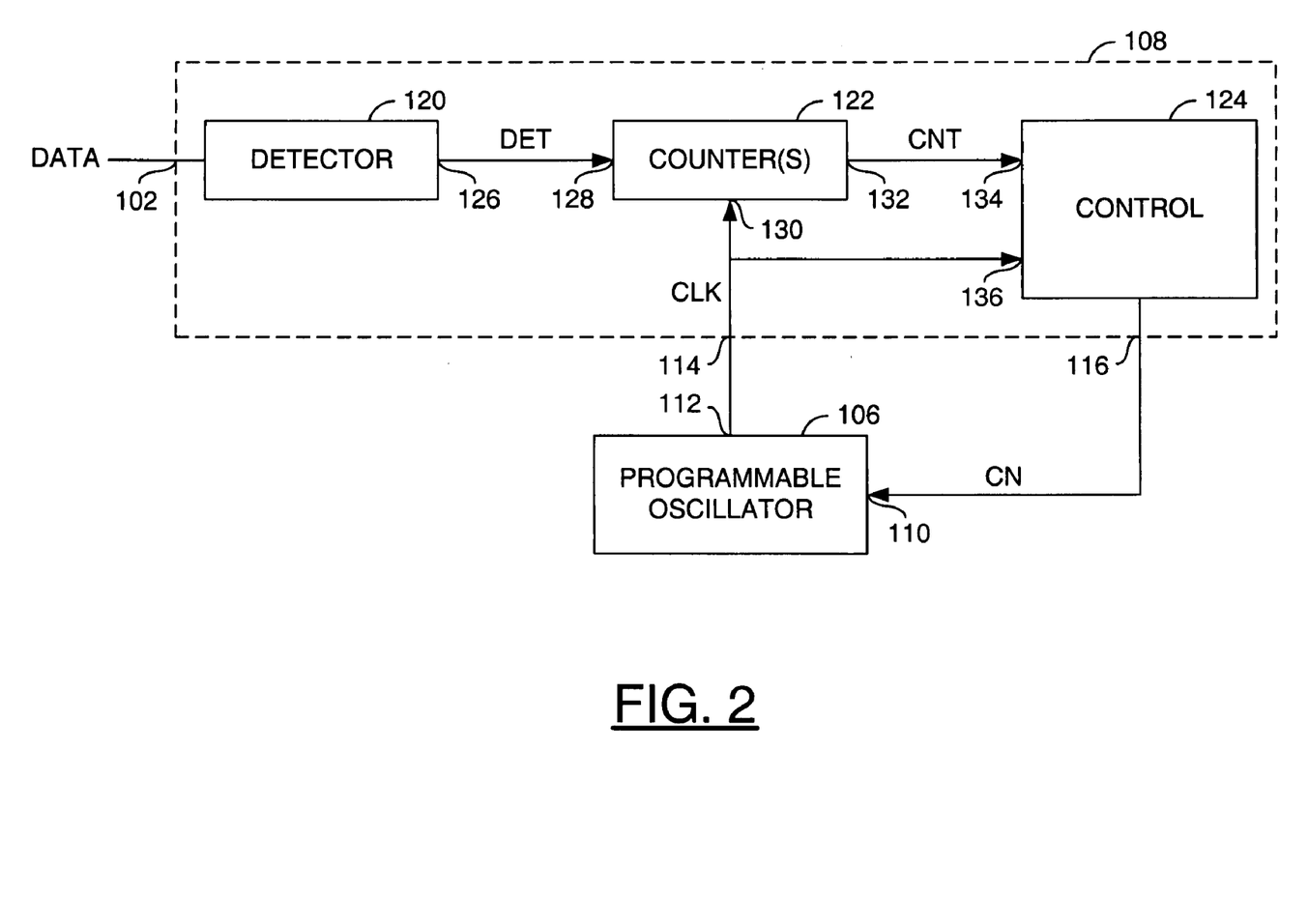
FIG. 2 is a detailed block diagram illustrating a preferred embodiment of the present invention.

Referring to FIG. 2, a detailed block diagram of the circuit 100 is shown. The circuit 108 may comprise, in one example, a circuit 120, a circuit 122, and a circuit 124. The circuit 120 may be a detector circuit. The circuit 122 may be a counter circuit. The circuit 124 may be a control circuit. The signal DATA may be presented to an input of the circuit 120. The circuit 120 may have an output 126 that may present a signal (e.g., DET) to an input 128 of the circuit 122. The circuit 120 may be configured to generate the signal DET in response to precise periodic events having a known time interval in the signal DATA. For example, the circuit 120 may be implemented as a SOF packet detector in accordance with the USB 2.0 standard. The signal DET may be a detection signal that may indicate, in one example, recognition of a start of frame packet. In one example, the signal DET may comprise a pulse for each SOF packet detected. For example, when the signal DATA comprises USB 2.0 SOF packets from a host system, the interval between pulses of the signal DET may be 1 ms+500 ns. However, other intervals may be implemented for other communication protocols.

The circuit 122 may be implemented, in one example, as one or more counters. The circuit 122 may have an input 130 that may receive the signal CLK and an output 132 that may present a signal (e.g., CNT) to an input 134 of the circuit 124. The circuit 122 may be configured to measure a time interval delimited by the signal DET. In one example, the circuit 122 may start counting transitions of the signal CLK in response to a first transition of the signal DET and stop counting transitions of the signal CLK in response to a second transition of the signal DET. The circuit 122 may be configured, in one example, to present a measured value for the time interval as the signal CNT. In one example, the signal CNT may comprise a count of a number of cycles of the signal CLK that occurred between two SOF packets in the signal DATA. Alternatively, the signal CNT may comprise a count of a number of cycles of the signal CLK that occur over a longer interval. For example, an interval comprising two or more SOF packets in the signal DATA.

The circuit 124 may have an input 136 that may receive the signal CLK. The circuit 124 may be configured to generate the signal CN in response to the signals CNT and CLK. The circuit 124 may be programmed with the known interval between precise periodic events of the signal DATA (e.g., the 1 ms±500 ns interval between USB 2.0 SOF packets). In one example, the circuit 124 may be configured to generate the signal CN as the difference between the known value for the interval and the measured value as presented by the signal CNT. The signal CN may be used to tune the frequency of the circuit 106. In one example, the circuit 106 may be a digitally tunable oscillator circuit and the signal CN may comprise digital tuning values from a look-up table addressed in response to the difference between the known value and the measured value for the time interval between, for example, SOF packets. In another example, the digital tuning values for the signal CN may be computed using the known value and the measured value for the time interval. For example, when a difference between the known value and the measured value for the time interval between SOF packets is +7 counts off (e.g., the signal CNT=expected value+7) and the oscillator 106 is configured to adjust 0.6 steps/count, the circuit 124 may compute a correction of −4.2 steps. A correction (tuning) value of −4 may be presented to the oscillator 106 (e.g., CN=−4).

Figure 3:
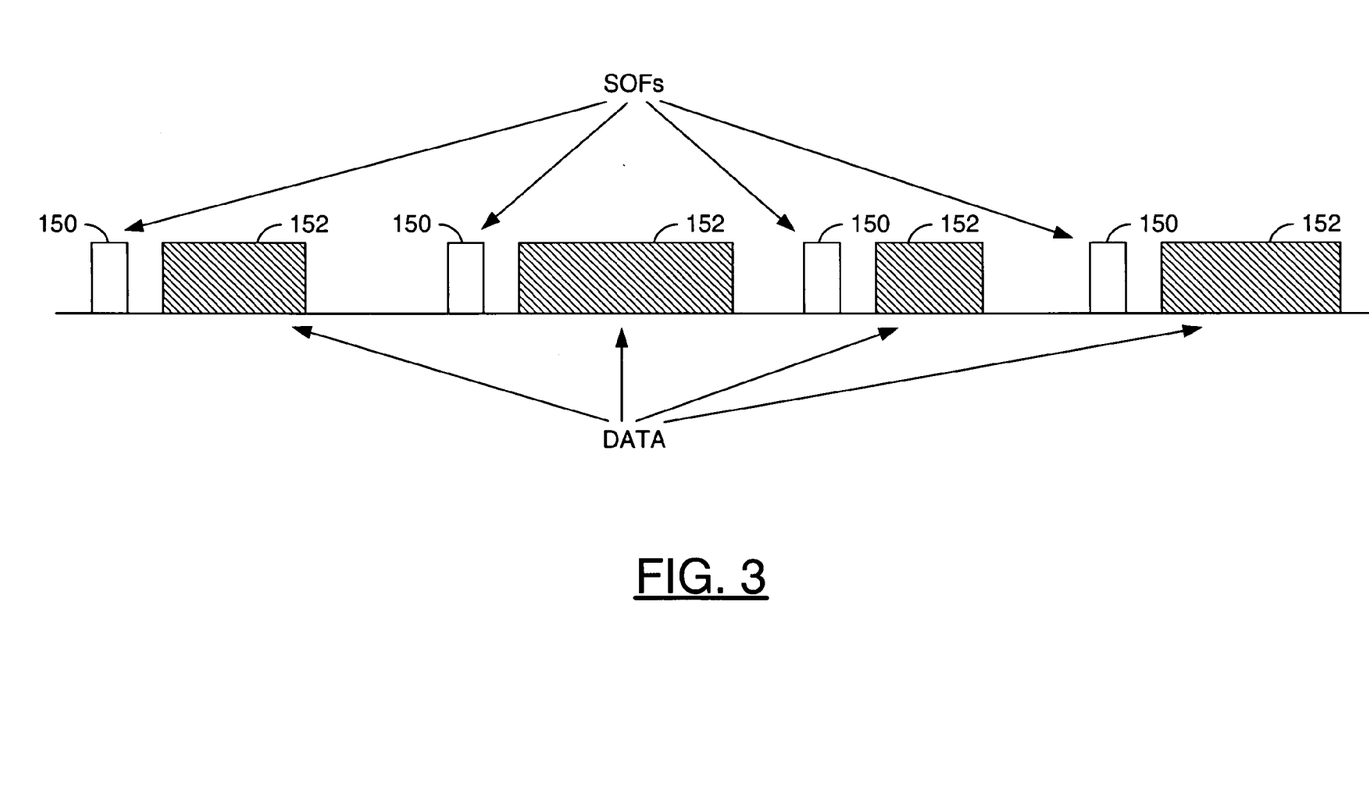
FIG. 3 is a timing diagram illustrating an example of a packetized communication protocol.

Referring to FIG. 3, a timing diagram illustrating a packetized communications data stream is shown. The data stream may contain a number of start of frame (SOF) packets 150 and a number of data packets 152. The SOF and data packets may be implemented in accordance with the USB 2.0 full-speed standard. The USB specification generally requires that the time interval between the SOF packets be maintained within 1.000 ms±500 ns. The precise separation of the SOF packets 150 may be used as a precision time reference (e.g., the variance of the time reference may be guaranteed by the 0.05% data rate requirement for hosts). When the programmable oscillator 106 is operating at a clock rate of 24 MHz, 24,000 counts may occur in one frame interval. The division of a frame interval into 24,000 parts (counts) may provide sufficient resolution for tuning the local oscillator to within a 0.25% final accuracy, even under worst case conditions.

Figure 4:
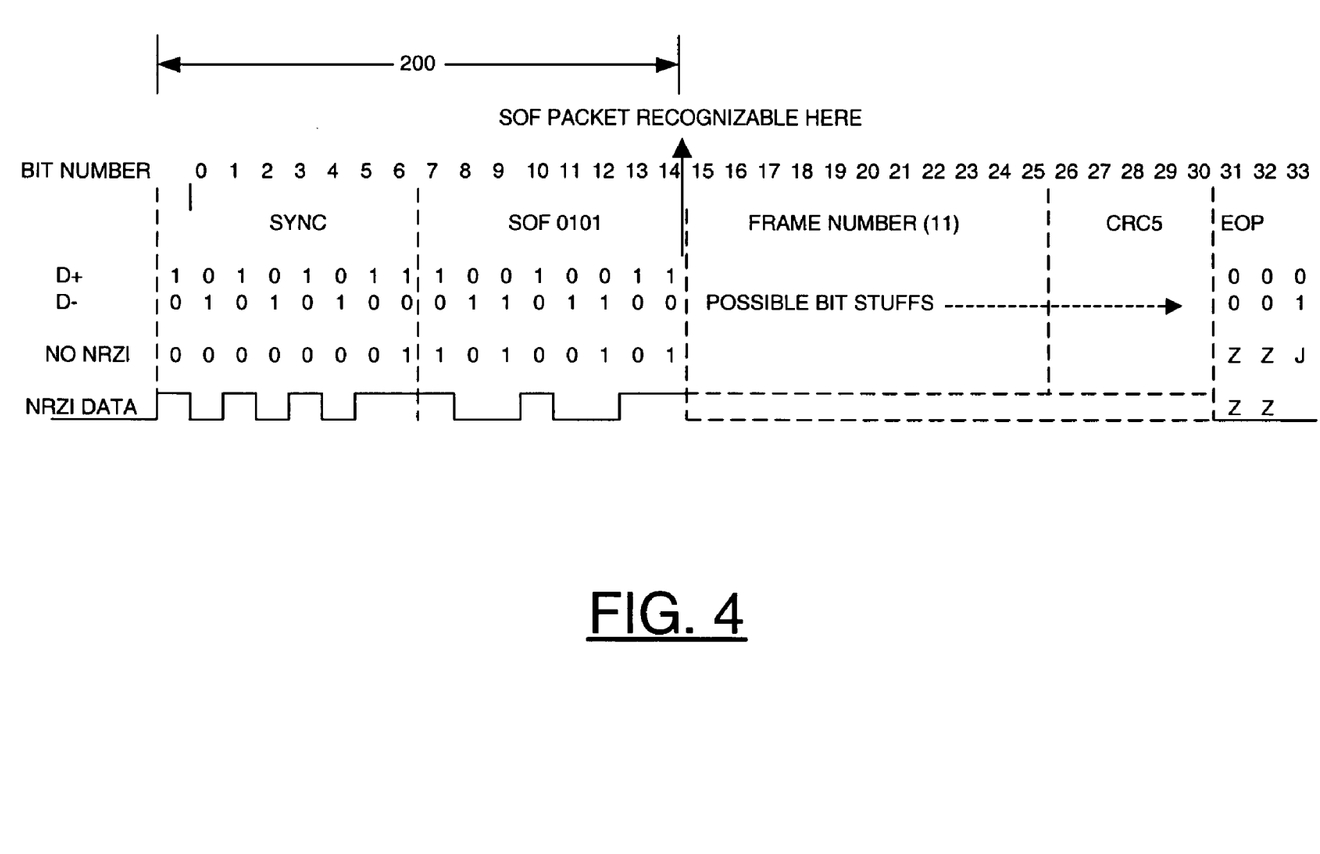
FIG. 4 is a timing diagram illustrating an example bit pattern of a start of frame packet of FIG. 3.

Referring to FIG. 4, a diagram illustrating an example bit pattern of a SOF packet of FIG. 3 is shown. The occurrence of the SOF packet in the data stream may be indicated by detection of the SOF bit pattern. The SOF packet may be recognized without an initially highly precise clock. The bit pattern of the SOF packet generally contains no long runs of data without transitions. With no long runs of data without transitions, the SOF packet generally does not require an accurate clock for detection. The SOF packet is generally recognizable within the first 15 bits (e.g., portion 200). In addition to the SOF identification bits (e.g., bits 7–14), the SOF packet may comprise a number of sync bits (e.g., bits 0–6), a frame number (e.g., bits 15–25), a cyclic-redundancy-code (CRC) (e.g., bits 26–30), possible bit stuffs, and an end-of-packet (EOP) marker (e.g., bits 31–33). In one example, the bit patterns may be presented in a Non-Return-to-Zero-Inverted (NRZI) format.

Referring to FIG. 5, a table illustrating an example of an accuracy analysis of the circuit 100 implemented with a target clock oscillator frequency of 24 MHz is shown. In accordance with the present invention, a clock oscillator may be tuned without an external precision timing component. In one example, a clock oscillator with an untuned accuracy of 10% may be adjusted to within 1.3% after one tuning, and within 0.26% after a second tuning (e.g., ~2 ms, or detection of three successive SOF packets). In another example, a clock oscillator with an untuned accuracy of 5% may be adjusted to within 0.7% after one tuning, and 0.19% after a second tuning. In general, a clock oscillator with an untuned accuracy within about 0.8% may be tuned to within 0.2% after one tuning (e.g., 1 ms or detection of two successive SOF packets). The data presented in FIG. 5 generally makes the following assumptions about the oscillator characteristics and error sources: (i) jitter in detecting successive SOF packets may be 175 ns (e.g., 2+bit times); (ii) oscillator jitter may be 3 ns; (iii) host SOF jitter may be 90 ns (e.g., 1 bit time) beyond the 500 ns of the USB specification; (iv) oscillator gain step size of 15 kHz/step at a 24 MHz clock rate; (v) gain step size may be trimmed to within 12%; and (vi) oscillator maximum linearity error may be 0.75 LSB. The step size of 15 kHz may provide sufficient resolution in the oscillator frequency. The above assumptions may be representative of a preferred implementation of the invention. However, acceptable performance to meet the design criteria of a particular implementation may be achieved using different assumptions concerning, for example, magnitude of error sources, gain step size, etc. For example, at 24 MHz, a 0.2% error is generally 48 kHz. The 15 kHz step size may allow tuning within ±3 steps to meet the USB specification. Higher frequency clocks may be used to provide finer step sizes. The terminology used in FIG. 5 may be summarized in the following TABLE 1:

TABLE 1

| Field | Units | Description |
|---|---|---|
| Clock Err | % | This gives the initial accuracy of the internal clock before the tuning step. The value is relative to the incoming USB data traffic rate. |
| Frame Time | ns | = 1ms (host 0.05% error not accounted for - chip locks req becomes 0.20%) |
| Min Time<br>Max Time | ns | Calculation of min (max) time for the total Bit Times, by subtracting (adding) Osc. Jitter and the appropriate Next/Pair Jitter to the nominal time. |
| ClockFreq | MHz | Nominal clock rate of internal oscillator. Initial error ('Clock Err') is from this number. This field, located above 'Min Count,' is entered by user. |
| Min Count<br>Max Count | — | Calculation of min and max possible counts over the bit time window.<br>Min = INT(MinTime * ClockFreq * (1 − ClockErr) / 1000)<br>Max = INT(MaxTime * ClockFreq * (1 + ClockErr) / 1000) + 1 |
| ClkMinRange<br>ClkMaxRange | MHz | Calculation of possible frequency range in the oscillator that could give the Min or Max Counts in the counter over the given bit time range (between Min Time and Max Time). Note that the possible ranges for a given count can exceed the initial Clock Err inaccuracy, and reflects the number the circuit must use in determining the possible frequency.<br>ClkMinRange = (Min Count − 1) * 1000 / (Max Time)<br>ClkMaxRange = (Max Count + 1) * 1000 / (Min Time) |
| TuneAmount:<br>AveMin<br>AveMax | MHz | This gives the tune amount necessary, in this case for the worst case counts that could occur under the specified conditions. The amount is the difference between average of the ClkMinRange (ClkMaxRange) and the ideal frequency.<br>TuneAmount = ClockFreq − (Average of ClkMin (Max) Range values) |
| TuneCounts<br>MIN<br>MAX | — | The MIN cases, shown in the second row, apply to AveMin TuneAmount.<br>The MAX cases, shown laster in the second row, apply to the AveMax TuneAmount.<br>This is the actual change in the oscillator trim setting, using the known step size for the oscillator. This is the amount of correction necessary to nominally trim the frequency to the right value. |
| MIN Tuning<br>MAX Tuning | MHz<br>% | These give the worst case final values of the clock after applying the correction. The error results from (A) the initial uncertainty in the clock frequency for a given count, (B) the error in the correction factor at this corner (Step Sizes Limit - nominal step size), and (C) Oscillator Linearity Error. The following two calculations illustrate a pair for the MIN case.<br>Min Freq = ClkMinRange[smallest] + (TuneCount * Smallest StepSize) − (LinearityError * Smallest StepLimit)<br>Max Freq = ClkMinRange[biggest] + (TuneCount * Biggest StepSize) + (LinearityError * Biggest StepLimit)<br>The % value is just the % error from the ideal |
| Max Error ...<br>MIN MAX | % | This is just the maximum value from the preceding MIN and MAX tuning results. |

In the USB system, the host generally transmits at a highly precise data rate (0.05% accurate) while 'Full Speed' (12 Mb/s data) devices are generally required to transmit with a somewhat more relaxed precision (0.25%). The required precision typically requires a local timing element, such as a crystal, as the basis for accurate data rate transmission. In the present invention, no highly precise timing element is generally used. A reasonably stable oscillator circuit 106 may be present on chip, and generally requires an initial accuracy of only 5 to 10%. The oscillator 106 may be capable of fairly rapid tuning. The circuit 100 may be configured to time incoming data, for example, the interval between start-of-frame (SOF) packets. The SOF packets may be specified to be transmitted by the host at 1 ms intervals, with no more than a ±500 ns error. By timing the precision time interval, the circuit 100 may determine the error in the programmable clock oscillator 106, and adjust the oscillator accordingly.

With standard CMOS processing, the circuit 100 may quickly achieve a precise frequency within 0.2% of the host clock rate (using the SOF interval). The present invention may, in one example, exploit characteristics of USB traffic to achieve the required precision using only a single USB data frame. However, other numbers of frames may be used.

Following a reset, the circuit 100 will generally receive a minimum of 10 SOF packets before transmitting anything. The circuit 100 may be configured to use the SOF interval to complete the precision tuning of the circuit 106. The SOF packets generally arrive at 1 ms intervals. The circuit 100 may be configured to continuously fine tune the circuit 106 using subsequent intervals.

In one example, various options on counting may exist, including:

1. Choosing an appropriate clock rate;
2. Choosing an initial wide-tuning range vs. a later limited tuning range (to avoid erroneous behavior on a badly placed SOF packet);
3. Determining the method for recognizing the SOF; and/or
4. Tuning the oscillator 106 directly on a single packet, rather than the interval (e.g., 1 ms) between 2 SOF packets. However, tuning the oscillator 106 directly may require a much higher frequency clock, for sufficient oversampling.

An alternative embodiment of the present invention may use pulses generated in response to the arrival of the SOF packets as the reference signal of a phase locked loop (PLL). The PLL would generally lock to the SOF packet rate. However, the use of a PLL involves additional design to achieve the desired accuracy in the required time (e.g., ~10 ms).

The present invention may take advantage of generally not needing to transmit with a precise clock until after a number of packets that are accurately timed by the host are received. The circuit 100 may initially tune during a reset time after a bus reset. The reset time may be, in one example, at least 10 ms (e.g., USB 2.0, section 7.1.7.6, time interval Δt6). Receiving 6 or fewer SOF packets will generally be sufficient to tune the oscillator 106 to within 0.25% in the accordance with the present invention. Following this initial tuning, continual incremental tuning may occur with each frame, or each pair of frames.

In one example, the oscillator 106 may need to be trimmed to provide a reasonably accurate frequency step size (e.g., a "gain" trim). Once the trimming is done, an "offset" trim to close to the target frequency may also be done. The trim values may be stored in non-volatile memory (e.g., EPROM, EEPROM, flash memory, etc.). The trim values stored in non-volatile memory may be loaded into the oscillator 106 during initialization (e.g., boot-loaded). For parts without non-volatile memory, a laser trimming step may be used.

The following process may illustrate an example operation of a device implemented in accordance with the present invention.

Step 1. The device may power up at a reset oscillator frequency. In general, the reset frequency may be less than the final target frequency.

Step 2. The device may be automatically brought close to the target frequency via the factory-set trim. In one example, the factory-set trim may be loaded from a non-volatile memory (e.g., EPROM, flash memory, EEPROM, etc.) and presented through a boot-loader during initialization. In another example, the factory-set trim may already be available through a laser trim. The trim setting may set the oscillator gain within ~10% of the ideal value, and the actual frequency to within 5% of the final frequency.

Step 3. A SOF interval counter may be reset. The reset value may be, in one example, zero. However, any other convenient value (e.g., 576 (240 hex)) may be used to simplify tuning, as explained below).

Step 4. A SOF packet may arrive, and may be signaled by a SOF detector. In one example, a standard USB Serial Interface Engine (SIE) may be used. However, other appropriate detection circuits may be implemented to meet the design criteria of a particular application. The arrival of the SOF packet may start the interval counter.

Step 5. Another SOF packet may arrive and may be again signaled by the SOF detector, stopping the interval counter. The count value will generally be 24000 counts from the reset value, for a clock frequency of 24 MHz. Deviation from the 24000 target count generally indicates an internal clock mismatch to the system clock.

Step 6. The circuit 100 may use the count error (e.g., the difference from the expected and the actual count) to look up a frequency correction value from a look-up table. In another example, the frequency correction value may be computed from the count error. The correction value may be applied to the on-chip digitally-controlled oscillator 106.

Step 7. The counter(s) may be reset. The next pair of SOF packets may again start and stop the counter(s), and a new correction number may be looked up (or computed) and applied to the oscillator.

Step 8. The step 7. may be repeated as often as desired, possibly on every pair of SOF packets.

Several options may be used for optimizing the circuit 100, including but not limited to:

(i) Using two different tuning modes—one for the initial tuning from power up, and another applied once the oscillator is 'locked.' The initial phase may allow wider tuning ranges, while in the stable phase the increment amount may be limited to prevent rapid changes in frequency.

(ii) Returning initially to the wider tuning mode after leaving a suspend mode.

(iii) Determining the limit, if any, for aborting the tuning on a count error that is outside a pre-defined acceptable range.

(iv) Tuning continuously from one SOF to the next, vs. tuning on SOF pairs. In the a first method, tuning may occur from SOF #1 to SOF #2, then SOF #2 to SOF #3, then SOF #3 to SOF #4, etc. In a second method, tuning may occur from SOF #1 to SOF #2, then from SOF #3 to SOF #4, then from SOF #5 to SOF #6, etc. The first method may provide more tuning events over a given time interval, but generally at the expense of a more complex counter design. In the second method, the counter may be stopped at the second SOF of each pair, and the result used for the tuning. In the first method, the counter result may be, in one example, captured (e.g., in a latch, register, etc.) and then immediately reset for the next interval. Alternatively, two counters may be used alternately to count successive intervals.

(v) Tuning across longer time intervals than between two successive SOFS. The counting interval may be chosen to be any integral number of SOFs, such as measuring across two frame times (e.g. from SOF #1 to SOF #3 or from SOF #n to SOF #n+2, where n is an integer). Generally, the interval may be measured across a number of SOF packets, for example, measuring from SOF #n to SOF #n+m where n and m are integers.

When the circuit 106 is updated, a faster-than-desired clock may occur for one cycle. To prevent updates to the digitally controlled oscillator from causing a somewhat faster-than-desired clock for one cycle at the update, the circuit 100 may be configured to filter or gate off the clock for one cycle during updates.

In one example, the SOF detect circuit 120 may only need to follow a SOF packet through a packet identifier field (PID). Following the packet only through the (PID) may relax the timing accuracy requirements (no long runs without a transition).

In one example (e.g., for a 24 MHz clock and a 1 ms interval), the number of counts in a 1 ms interval will nominally be 24000. Resetting the counter 122 with a value of 576 may result in the LSBs being zero under the ideal case (e.g., count=24576=0×3000hex). By resetting the counter to 576, a number of the LSBs may be used as an index into a correction look-up table. An example look-up table may be summarized in the following TABLE 2:

TABLE 2

| For |Count-24000| in range of: | | Tuning Amount (steps) [Tune up if count <24000 |
| --- | --- | --- |
| Minimum | Maximum | Tune down if count >24000] |
| 0 | 7 | 0 |
| 8 | 22 | 1 |
| 23 | 37 | 2 |
| 8 + 15* (N-1) | 7 + 15*N | N |

Table 2 assumes a 24 MHz clock counting over 1 ms interval and oscillator gain=15 kHz/step. However, other appropriate look-up table values may be selected to meet the design criteria of the particular design.

When the signal CN is selected to have 8 bits and a step size is selected to be ~15 kHz, the oscillator circuit 106 may have a range of about 4 MHz. However, other step sizes for the oscillator 106 and other numbers of bits for the signal CN may be implemented to meet the design criteria of a particular application.

While the invention has been particularly shown and described with reference to the preferred embodiments thereof, it will be understood by those skilled in the art that various changes in form and details may be made without departing from the spirit and scope of the invention. For example, while the present invention has been described with respect to the full speed mode of the Universal Serial Bus, the present invention may be applicable to other data communications protocols as well.

The invention claimed is:

1. An apparatus comprising:
a circuit configured to (i) receive an input data stream, (ii) generate an output having a frequency and (iii) adjust said frequency in response to a measured duration of a known time interval associated with a period between a first occurrence of a predefined bit pattern and a second occurrence of said predefined bit pattern in said input data stream.

2. The apparatus according to claim 1, wherein said input data stream comprises one or more of said time intervals.

3. The apparatus according to claim 2, wherein said time intervals are delimited by periodic events in said input data stream.

4. The apparatus according to claim 3, wherein said periodic events comprise start-of-frame (SOF) packets of a Universal Serial Bus (USB) protocol.

5. The apparatus according to claim 1, wherein said frequency is adjusted to within 0.25% of a host data rate.

6. The apparatus according to claim 1, wherein said circuit comprises:
a calibration circuit configured to generate a control signal in response to said input data stream and said output; and
an oscillator circuit configured to generate said output in response to said control signal.

7. The apparatus according to claim 6, wherein said oscillator circuit is digitally tunable.

8. The apparatus according to claim 6, wherein said calibration circuit comprises a detector circuit configured to detect said predefined bit pattern.

9. The apparatus according to claim 8, wherein said detector circuit is further configured to detect a SOF packet.

10. The apparatus according to claim 6, wherein said calibration circuit comprises one or more counters.

11. The apparatus according to claim 10, wherein said counters are configured to start counting in response to a first SOF packet and stop counting in response to a second SOF packet.

12. The apparatus according to claim 10, wherein said counters are configured to count in response to said output.

13. The apparatus according to claim 6, wherein said calibration circuit comprises a look-up table.

14. The apparatus according to claim 13, wherein said look-up table contains a number of values for adjusting said frequency.

15. An apparatus comprising:
means for generating an output having a frequency;
means for measuring a known time interval between a first occurrence of a predefined bit pattern and a second occurrence of said predefined bit pattern in an input data stream using said output; and
means for adjusting said generating means in response to said measurement.

16. A method for providing a precise clock using a precisely known time interval having a known precise duration of a data stream comprising the steps of:
(A) measuring the known time interval between a first occurrence of a predefined bit pattern in said data stream and a second occurrence of said predefined bit pattern in said data stream using said clock; and
(B) adjusting said clock in response to a difference between said measurement and said known precise duration.

17. The method according to claim 16, wherein said time interval comprises the time between a pair of SOF packets.

18. The method according to claim 16, wherein the step A comprises the sub-steps of:
(A-1) starting a counter in response to said first occurrence of said predefined bit pattern that starts said known time interval;
(A-2) counting in response to said clock; and
(A-3) stopping said counter in response to said second occurrence of said predefined bit pattern that ends said known time interval.

19. The method according to claim 16, wherein the step B comprises the sub-steps of:
(B-1) comparing a measurement of said known time interval between said first and said second occurrences of said predefined bit pattern with the known duration of said known time interval;
(B-2) retrieving a correction value from a look-up table addressed using a difference between said measurement and said known duration; and
(B-3) presenting said correction value to a digitally tunable oscillator.

20. The method according to claim 16, wherein the step B comprises the sub-steps of:
(B-1) starting a counter in response to said first occurrence of said predefined bit pattern that starts said known time interval;
(B-2) computing a correction value using said difference between said measurement and said known duration; and
(B-3) presenting said correction value to a digitally tunable oscillator.

21. The method according to claim 16, wherein the measured time interval comprises a plurality of SOF packets.

22. The apparatus according to claim 1, wherein said predefined bit pattern comprises a packet identifier field of a SOF packet.

23. The apparatus according to claim 1, wherein said circuit comprises:
a detector circuit configured to generate a detection signal in response to detecting said predefined bit pattern in said input data stream; and
a counter circuit configured to generate a count signal in response to said detection signal and said output.

24. The apparatus according to claim 23, wherein said circuit further comprises:
a control circuit configured to generate a tuning signal in response to said count signal and said output; and
an oscillator circuit configured to generate said output in response to said tuning signal.

25. The apparatus according to claim 4, wherein said input data stream comprises USB 2.0 host full-speed communications SOF packets.

* * * * *